US005346625A

United States Patent [19]

Webb

[11] Patent Number: 5,346,625

[45] Date of Patent: Sep. 13, 1994

[54] FLAMMABLE NEUTRALIZING SYSTEM AND PACKET

[75] Inventor: Michael C. Webb, Chester Springs, Pa.

[73] Assignee: Environ Products, Inc., Lionville, Pa.

[21] Appl. No.: 962,981

[22] Filed: Oct. 16, 1992

[51] Int. Cl.[5] .......... C02F 1/28

[52] U.S. Cl. .......... 210/691; 210/198.1; 210/242.2; 210/925; 252/601; 222/54

[58] Field of Search .......... 210/198.1, 242.1, 242.4, 210/924, 925, 691, 922; 252/601, 610, 611; 222/54

[56] References Cited

U.S. PATENT DOCUMENTS 3,494,862 2/1970 Horowitz .......... 210/924
4,155,971 5/1979 Wysong .......... 260/204
4,356,088 10/1982 Matteelli et al. .......... 210/198.1
4,561,981 12/1985 Characklis .......... 210/764

*Primary Examiner*—Neil McCarthy
*Attorney, Agent, or Firm*—Eugene E. Renz, Jr.

[57] ABSTRACT

A system for neutralizing petroleum products leaked into an enclosed portion of a fuel transfer system such as a sump. The system comprises the use of a water insoluble container having a quantity of a petroleum product mitigation agent enclosed therein. A water insoluble barrier for releasing the quantity of mitigation agent upon contact with a petroleum product permits the mitigation agent to neutralize the petroleum product as soon as it is present and in contact with the barrier. The container may be formed from polystyrene and positioned in the sump to permit the release to the petroleum products regardless of the amount of water present in the sump. In one embodiment, the tube is vertically aligned and extends from the bottom to the top of the sump. Alternatively, the container comprises a petroleum product soluble packet and includes flotation aid for maintaining the packet floating on top of any water in the sump. In another embodiment, the container is positioned above the sump and the water insoluble release barrier includes a closure valve for urging release of the petroleum product mitigation agent and a petroleum product soluble rod opposing the closure valve until petroleum product is present in the sump.

17 Claims, 3 Drawing Sheets

FLAMMABLE NEUTRALIZING SYSTEM AND PACKET

FIELD OF THE INVENTION

The present invention relates to a device for reducing the hazard from inadvertent gasoline spills in fuel dispensing systems, and more particularly to a device and method for providing a fuel mitigation chemical automatically released into contact with the leaked fuel as the fuel becomes present in the localized environment.

BACKGROUND OF THE INVENTION

Petroleum product storage and distribution has been a large industry for many years. During the growth of this industry, systems have been developed for storage and distribution at service stations and fuel depots all over the world. Systems have been developed to store petroleum products in large underground storage tanks, with piping systems designed to transfer the fuel to individual pump dispensers or to other tanks for mixing or blending before final distribution.

As part of that development has been the effect that these systems have on the environment, both from a concern for prevention of leaks and spills and from a safety concern. Systems have been developed in which a primary pipe is used for supply of the gasoline or other petroleum product and a secondary or containment pipe is placed on the outside of the primary pipe to provide a secondary barrier to escaped fuel or damage to the piping system.

As the fuel distribution systems have become more complex, and efforts of containment and protection have increased, chambers or sumps have been used at various points in the system, particularly at junctions and originating or dispensing stations. As is becoming more and more common in the petroleum product industry, these sumps are usually located at the lowest point in the path of piping lines which contain petroleum products such as gasoline and the like.

The sumps are also likely to collect water from rain or run-off from washing or simply from ground water that seeps into the sump. Depending upon the particular conditions of climate and usage, the sump may contain little or no water or the sump may be nearly full of water. In prior art systems, the only way that leakage of fuel into the sump or the piping lines could be discovered was to open the sump and look or smell to detect the presence of gasoline or other hydrocarbon products.

This use of visual or olfactory senses to detect leaks has not been particularly successful for several reasons. If the leak is small, or perhaps represents a spill which is non recurring, there is no really safe and effective way to remove the fuel. Yet, the presence of small quantities of gasoline and the like represents a serious hazard as a potentially explosive condition and removal of the hazard is necessary. Moreover, such a detection system requires regular and frequent inspection, thereby requiring a significant labor cost.

There have been some attempts to install a detector system in sumps and the like but they have not been successful in detecting and removing small quantities of flammable liquids. As has been noted, most sumps collect varying quantities of water as part of normal operations of the piping systems. Any detection device which might be installed would have to distinguish between the presence of water and the presence of flammable or explosive liquids such as gasoline. Water is not only tolerated but is expected to be present in much larger volumes than would be tolerated if the liquid were explosive or flammable. Since most hydrocarbons and petroleum products are lighter than water and are also not miscible in water, the petroleum product tends to float on top of the water in the chamber. When water levels vary greatly in any given sump, placement of the detector becomes difficult if not impossible. Such a system and method would be of great advantage in the art.

Flammable liquids such as gasoline and the like are potentially quite dangerous because of the capability of these liquids to explode when mixed with oxygen in certain ratios and when confined to closed environments. Sumps which are located at low points on the piping system are often collection points for drainage of leaks or spills of fuels from remote places in the system, so that the potential for an explosion may not even be known to exist. Inspection by a human may itself be dangerous or potentially the source of a spark to cause combustion of the explosive fuel and air mixture.

Also, since sumps are expected to fill with water, often these sumps are provided with pumps which remove the collected water from time to time. Not only is it important to prevent explosions at this time, it is desirable that no contaminating petroleum products be present in the water as it is pumped from the sump and discharged, perhaps into a sewer or other waste disposal system.

Accordingly, it is an object of the present invention to provide a system and method for neutralizing flammable liquid contamination of petroleum product storage and distribution systems.

Another object of this invention is to provide a device and method for neutralizing flammable liquid contamination in the presence of water, no matter how much or little water is present at the time of the contamination.

Yet another object of the present invention is to provide a device capable of operating to neutralize flammable liquids automatically and without need for human supervision.

Other objects will appear hereinafter.

SUMMARY OF THE INVENTION

It has now been discovered that the above and other objects of the present invention may be accomplished in the following manner. Specifically, the present invention provides a device for neutralizing petroleum products leaked into an enclosed portion of a fuel transfer system. The device is operable in any of the enclosures where water is likely to accumulate, and is specifically designed for use in a fuel transfer system sump in which water may be present and in which petroleum products leaking from the system may accumulate.

In accordance with one embodiment of the present invention includes a water insoluble container having a quantity of a petroleum product mitigation agent enclosed therein. Such mitigation agents are presently available and function to remove or encapsulate hydrocarbons and the like. One preferred material which is commercially available is BioSolve hydrocarbon mitigation agent manufactured and distributed by Southeast BioSolve, Inc. of Jacksonville, Fla. This product is a blend of fuel mitigation and encapsulation agents, and is a non-flammable water base blend of emulsifiers, wetting and flame inhibiting agents. BioSolve includes a fluorescent tracing dye for detection and removal of that quantity of material which has emulsified and/or encapsulated gasoline and oil particles.

Another product which is also extremely effective as a mitigation agent for petroleum products is a volcanic clinoptilolite powder or crystal, sold under the trade name Fumeaway, by International Enviroguard Systems, Inc. of Corpus Christi, Tex. Fumeaway absorbs and encapsulates flammable fluids such as gasoline, oil, diesel fuel and the like and can be used in the present invention in either crystal or powder form.

Other products of this type are also available and are intended for use in the present invention. All that is required is that the petroleum product mitigation agent be capable of removing or otherwise encapsulating or dissolving hydrocarbons such as gasoline, diesel fuel and other hydrocarbon products upon contact.

The petroleum product mitigation agent is housed in a container which is water insoluble and which includes a water insoluble release device for releasing some or all of the mitigation agent upon contact as soon as there is the presence of a petroleum product. This permits the mitigation agent to neutralize the petroleum product promptly and without need of human supervision or monitoring.

The present invention is based on the recognition that certain materials are insoluble and unaffected by water and other similar liquids while these same materials are readily soluble or meltable in hydrocarbons. One such material which is well known is polystyrene. Cups made from polystyrene hold hot coffee, cold drinks and all forms of waterous liquids, yet they are not capable of holding gasoline or other hydrocarbon fluids at all. Accordingly polystyrene and similar materials are preferred materials for making the water insoluble release device which will release the neutralizing agent upon contact with a hydrocarbon and the like.

One embodiment of the present invention comprises the use of a packet or container which is made from polystyrene or other petroleum product soluble materials. This packet should include a flotation means such as an air pocket to maintain the packet floating on top of any water in the sump. In this manner, the packet or packets may conveniently be dropped into the sump and will float on any water which is in the sump. The packets are large enough so that they won't be removed when the sump is pumped to remove water, and are also large enough to contain enough BioSolve or other agents to remove any fuel which leaks into the sump.

In another embodiment, a container is formed into an elongated hollow tube formed from polystyrene and positioned in a sump to extend from the top to the bottom of the sump. No matter what quantity of water is present in the sump or similar chamber, the surface of the water will be located somewhere alone the axial length of the tube. As gasoline or the like leaks into the sump, from a leak or spill or other cause, the fuel will float on the surface of the water and will contact the polystyrene tube at the interface of the water surface and the tube. Since the polystyrene is soluble in the fuel, it will melt or dissolve and quickly release the hydrocarbon neutralizing agent regardless of the amount of water present in the sump.

In yet another embodiment, larger quantities of the petroleum product mitigation agent may be employed by storing that larger quantity in a larger container than the packet or filled tube. A larger container is filled with the petroleum product mitigation agent and is positioned above the sump. This container has a water insoluble release means for this embodiment including closure valve for the discharge opening, normally biased to an open discharge position to permit discharge of the mitigation agent and a water insoluble opposing means for opposing the closure valve to normally maintain the valve in a closed position. The opposing means in this embodiment is a water insoluble petroleum product sensitive rod, again preferably made from polystyrene or the like which extends from the bottom of the sump to the closure valve. This rod prevents the spring from opening the container and dispensing the contents until some quantity of petroleum product is present in the sump. At this time, the rod dissolves and no longer opposes the opening of the valve in container, thus allowing release of the petroleum product mitigation agent.

BRIEF DESCRIPTION OF THE DRAWINGS

For a more complete understanding of the invention, reference is hereby made to the drawings, in which.

DETAILED DESCRIPTION OF THE PREFERRED EMBODIMENT

Figure 1:
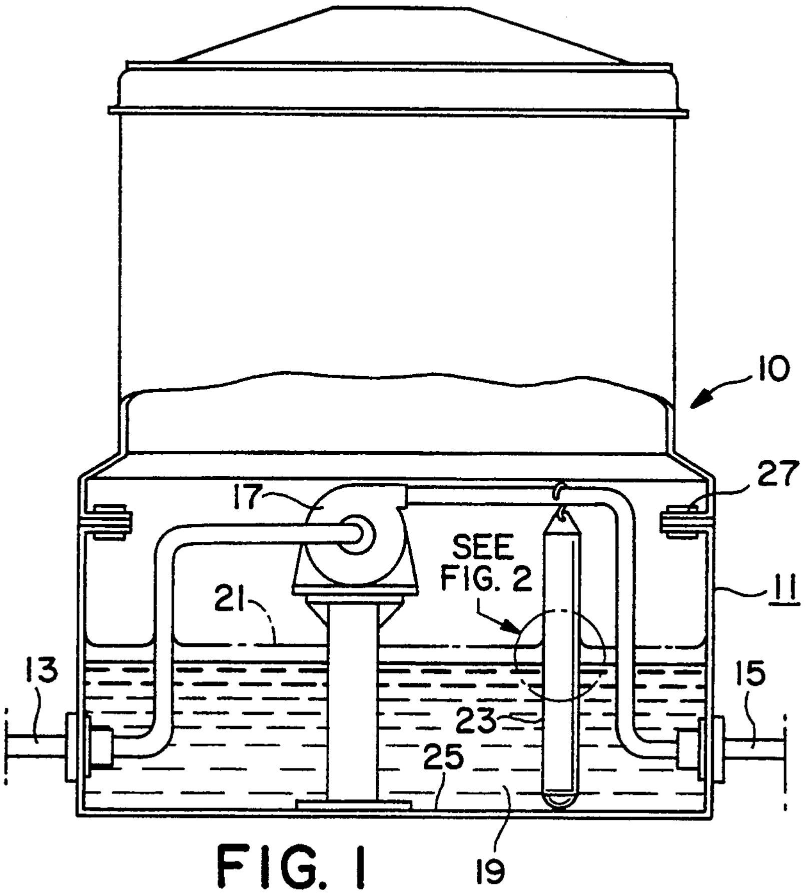
FIG. 1 is a schematic, side elevational view of portion of a fuel distributions system, showing a pump and fuel transporting lines into and out of a sump, with the lower half of the sump being broken open and in section to more clearly show one embodiment of the invention.

The present invention is most suited for use with fuel storage and delivery systems, a portion of which is shown in the drawings, where fuel or other petroleum products are stored in storage tanks until needed. Fuel is then pumped from the storage tanks to various dispensing stations using a system of piping and including at least one sump or other chamber in which access to the piping or pumping apparatus may be had.

FIG. 1 illustrates a portion of a fuel distribution system 10 generally with a sump 11 and fuel transporting lines 13 into and 15 out of sump 11 via pump 17, in which one embodiment of the invention is shown. In sump 11, a quantity of water 19 has collected along with a smaller but undesirable quantity of petroleum product 21 which, as is expected, floats on top of water 19.

Figure 2:
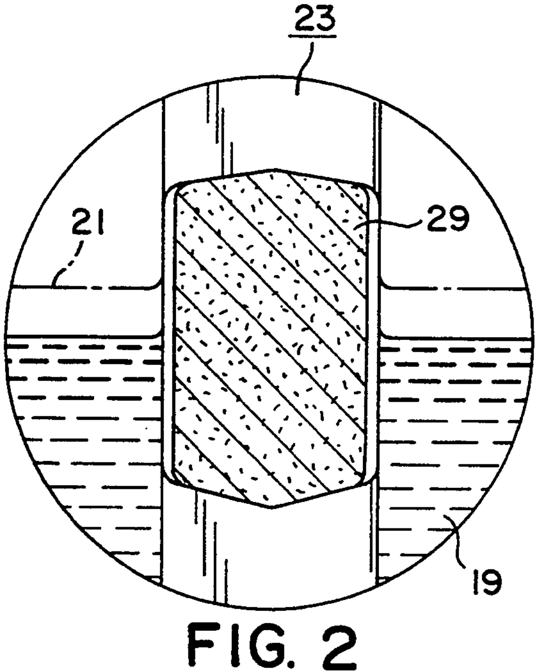
FIG. 2 is an enlarged, fragmentary view of the details contained within the dot and dash circle of FIG. 1 and designated FIG. 2.
Figure 2A:
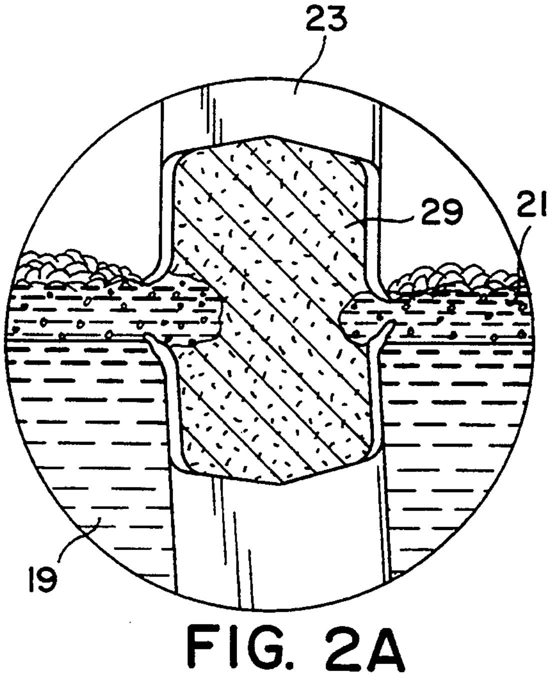
FIG. 2A is a view similar to FIG. 2 showing the embodiment in a later stage of use.

As shown in FIGS. 2 and 2A, a hollow rod 23 which extends from the bottom 25 to the top 27 of sump 11 is positioned so that wherever the petroleum product 21 collects, rod 23 will be in direct contact with it. In the unusual event that the petroleum product is heavier than water, however, the invention as shown in this embodiment will still present rod 23 in contact with petroleum product 21. Rod 23 is formed from polystyrene or another water insoluble material which is also soluble or meltable in hydrocarbons and the like so as to release a quantity 29 of petroleum product mitigation agent such as BioSolve or Fumeaway into contact with the petroleum product.

FIG. 2 shows in greater detail the portion of rod 23 containing mitigation agent 29 at the level where the water 19 and petroleum product 21 interface. In FIG. 2A, the petroleum product 21 has dissolved a portion of the wall of rod 23, weakening the rod 23 and releasing the mitigation agent 29.

The petroleum product mitigation agent 29 of the present invention is capable of removing petroleum products from the hydrocarbon storage and dispensing system sumps and the like by changing the nature of the hydrocarbon material. As set forth above, such mitigation agents are presently available and function to remove hydrocarbons and the like. The preferred material of this invention and which is commercially available is BioSolve hydrocarbon mitigation agent, manufactured and distributed by Southeast BioSolve, Inc. of Jacksonville, Fla. As previously stated, BioSolve is a blend of fuel mitigation and encapsulation agents, and is a non-flammable water base blend of emulsifiers, wetting and flame inhibiting agents. BioSolve includes a fluorescent tracing dye for detection and removal of that quantity of material which has emulsified and/or encapsulated gasoline and oil particles. It may be considered to be a water base detergent. Preferably, it is biodegradable, as is BioSolve.

Also effective is Fumeaway volcanic clinoptilolite, in crystal or powder form, manufactured and distributed by International Enviroguard Systems, Inc. of Corpus Christi, Tex. Fumeaway absorbs and encapsulates flammable fluids such as gasoline, oil, diesel fuel and the like and can be used in the present invention in either crystal or powder form.

BioSolve, Fumeaway and other similar materials are capable of mitigating the flammable nature of hydrocarbons such as gasoline and the like. Among the materials which are mitigated by these agents are gasoline, benzene, zylene, toluene, petroleum distillate products, JP grades aviation gas, kerosene, diesel fuel and the additives in these fluids which might be flammable or hazardous. Among the chemical groups which these materials are effective in removing are glycol ethers, glycol ether acetates, high flash point polyoxypropylene amines, polyethylene glycols, ketones such as acetone and methyl ethyl ketone, alcohols such as methanol, isopropanol, isobutyl alcohol and the like, aliphatic solvents such as heptane, hexane, naphtha, mineral oil, and mineral spirits, and other solvents and chemical agents normally found in petroleum products such as fuels and the like.

Other products of this type are also available and are intended for use in the present invention. All that is required is that the petroleum product mitigation agent be capable of removing or otherwise encapsulating or dissolving hydrocarbons such as gasoline, diesel fuel and other hydrocarbon products upon contact.

Figure 3:
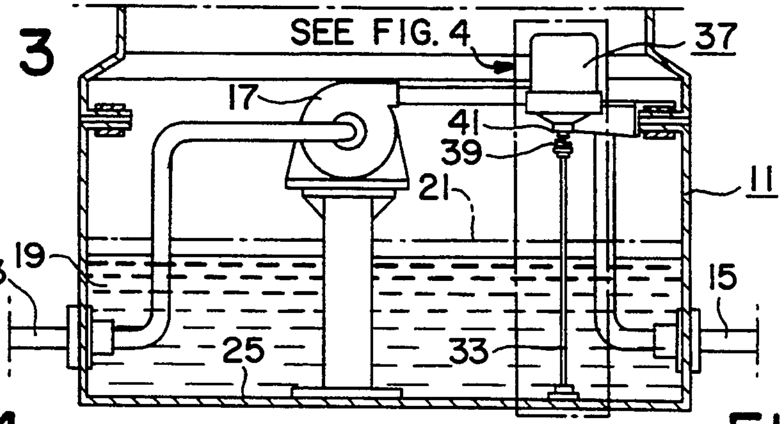
FIG. 3 is a view similar to FIG. 1 showing the lower portion of the sump only and a second embodiment of the present invention.
Figure 4:
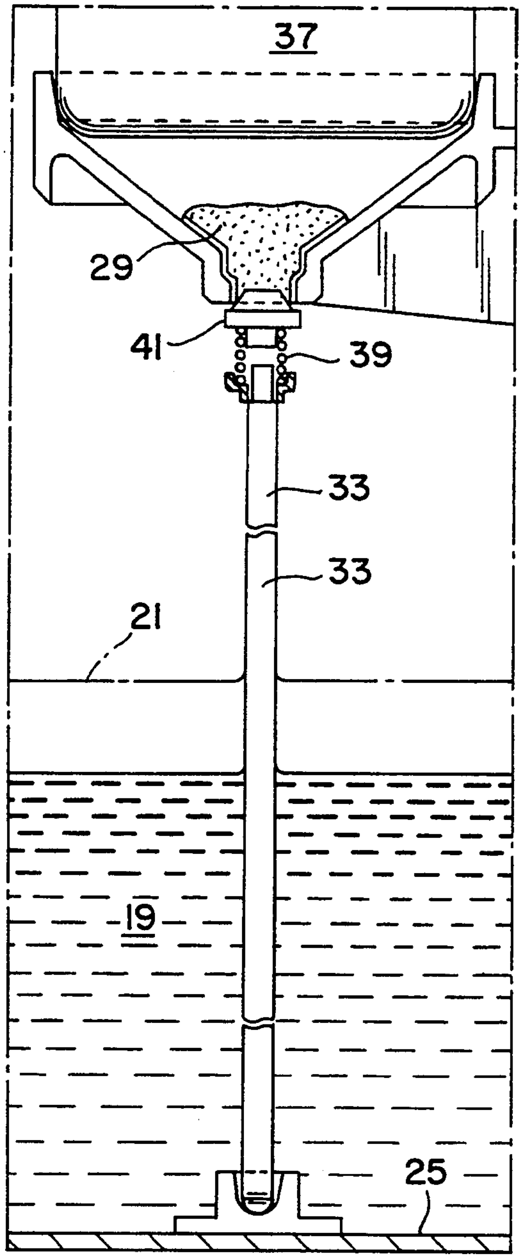
FIG. 4 is an enlarged, fragmentary view of the details contained within the dot and dash rectangle of FIG. 3 and designated FIG. 4.
Figure 4A:
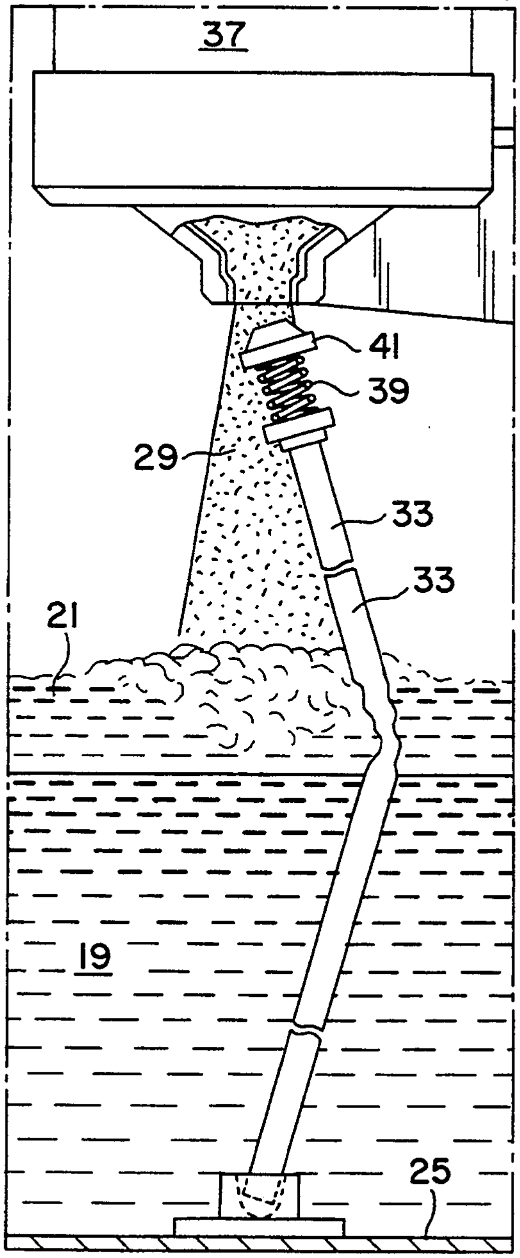
FIG. 4A is a view similar to FIG. 4 showing the embodiment in a later stage of use.
Figure 5:
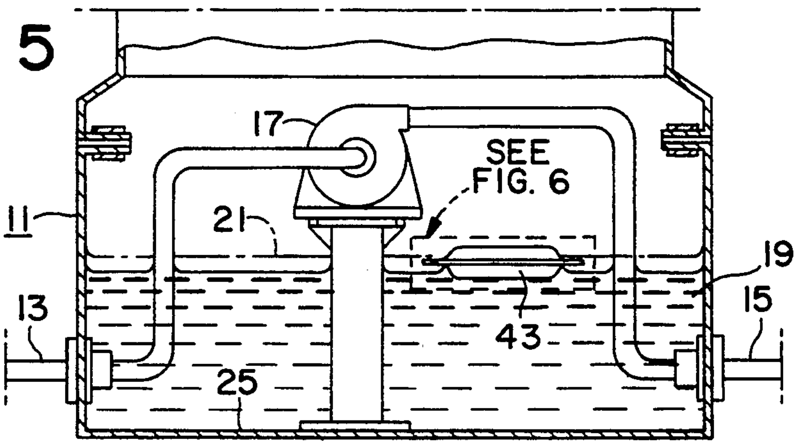
FIG. 5 is a view similar to FIG. 3 showing a third embodiment of the invention.

An alternative embodiment is shown in FIGS. 3, 4 and 4A, in which the same sump 11, water 19 and petroleum product 21 are present. In this embodiment, a solid rod 33 made of polystyrene as previously described for rod 23 is mounted at the base 25 of sump 11 and is placed in operable relationship with bottle 37, which in this case holds the petroleum product mitigation agent 29. Due to the scale, portions of continuous detail in height of the rod 33 have been broken out in FIGS. 4 and 4A. Rod 33 is aligned to oppose the force of biasing means or spring 39 which in turn holds closure stopper 41 in container 37.

Shown in greater detail is the lower end neck portion of container 37, held in a supporting collar and bracket where solid rod 33 engages spring 39 and stopper 41 at one end and the bottom 25 of the sump at the other end of the rod 33. When solid water insoluble rod 33 contacts petroleum product 19, rod 33 dissolves or melts and becomes deformable in the presence of the hydrocarbon fluid, releasing the force of spring 39 and closure stopper 41 is opened, causing petroleum mitigation agent 39 to pour into sump 11 and remove the hazardous petroleum product 21. In FIG. 4A, the rod 33 is shown bending and falling away after spring 39 has imparted its force on rod 33 to initiate the bending, now releasing the unstoppered contents 29 of bottle 37 into the petroleum layer 21.

In another preferred embodiment of the present invention, illustrated in FIGS. 5, 6, 7 and 8, a supporting structure is not used. Rather, a packet 43 formed from a water in-soluble film of polystyrene or the like encloses a quantity of petroleum product mitigation agent 45 for placement in sump 11 for contact with petroleum product 21 as it floats on water 19. Seam walls 47 of packet 43 extend beyond the pocket containing contents 45 of the packet and have chambers 49 formed therein to entrap a quantity of air so as to insure that the packet 41 will float on water 19 and more readily contact petroleum product 21.

Figure 6:
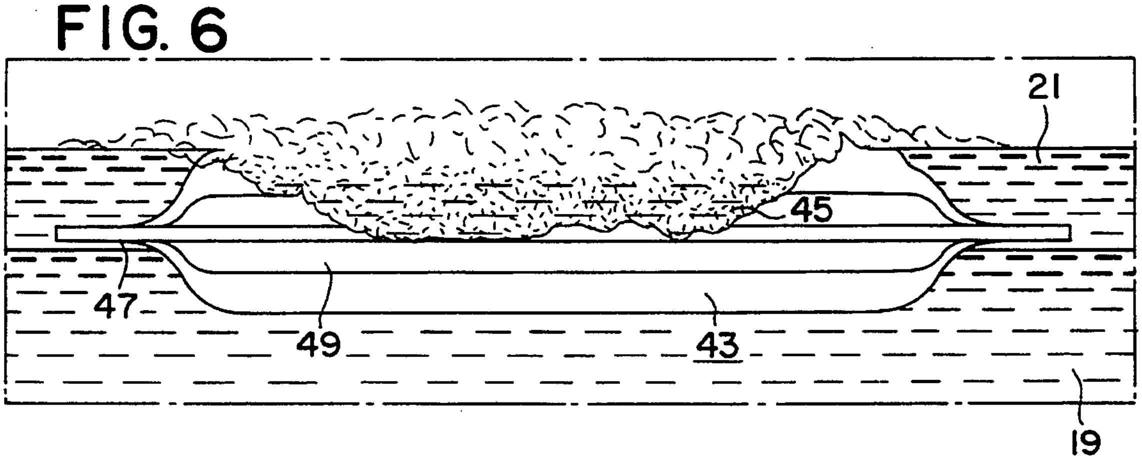
FIG. 6 is an enlarged, fragmentary elevational view of the detail contained within the dashed rectangle of FIG. 5 and designated FIG. 6 showing the embodiment in use.
Figure 7:
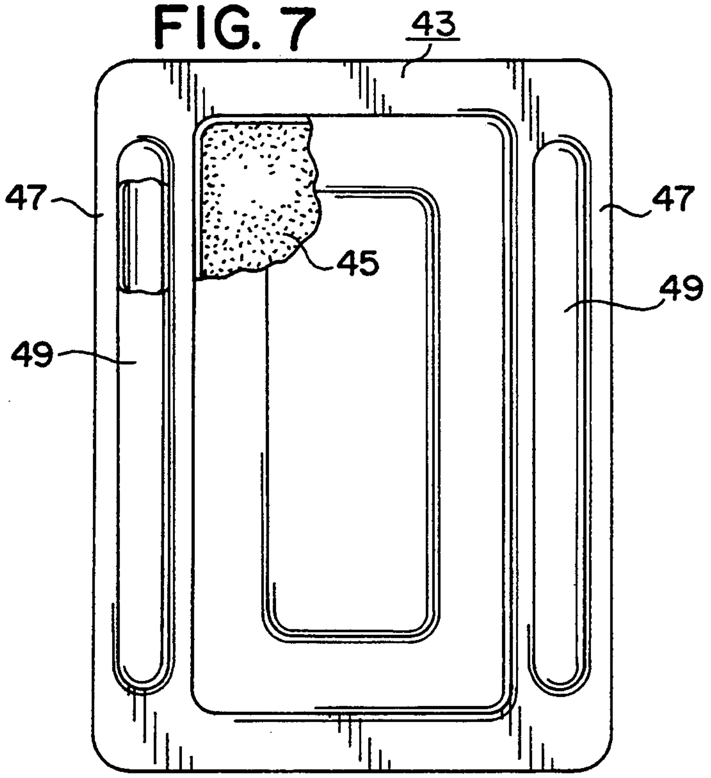
FIG. 7 is a plan view of the embodiment shown if FIGS. 5 and 6, with portions broken away and in section.
Figure 8:
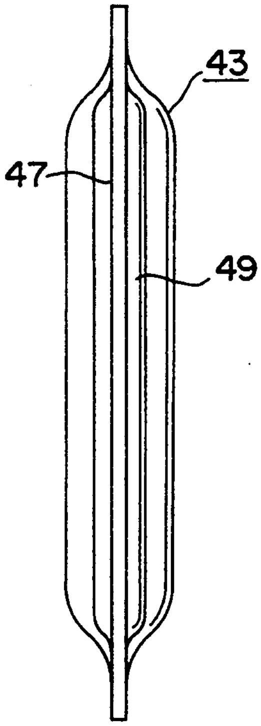
FIG. 8 is a side elevational view of the device shown in FIG. 7.

FIG. 6 shows the dissolving of the packet surface in contact with the petroleum product allowing the discharge of mitigation agent 29 to mix with petroleum layer 21 on water 19.

A number of tests have been performed to demonstrate that various quantities of petroleum products such as gasoline and the many other materials listed above are encapsulated and removed by contact with a petroleum product mitigating agent such as the previously described BioSolve or Fumeaway. Each of the embodiments shown in the figures are suitable for supporting an effective quantity of mitigation agent in a water insoluble and protected condition, and each are capable of delivering that quantity of mitigation agent upon contact with those petroleum products which are likely to be found in a sump or other container of the type described. Effective neutralization of gasoline and other dangerous hydrocarbons by the present invention significantly reduces dangerous conditions and markedly reduces the likelihood of further pollution or contamination by petroleum products.

While particular embodiments of the present invention have been illustrated and described, it is not intended to limit the invention, except as defined by the following claims.

I claim:

1. A device for removing petroleum products leaked into an enclosed portion of a fuel transfer system, comprising:

a water insoluble container having a quantity of a petroleum product mitigation agent enclosed therein for mitigating the flammable nature of said petroleum product; and a water insoluble, petroleum product soluble release means for releasing said quantity mitigation agent upon contact with a petroleum product whereby said release means is dissolved or melted by contact with said petroleum product thereby permitting said mitigation agent to be released from said container to mitigate the flammable nature of said petroleum product.

2. The device of claim 1 wherein said device is located in a fuel transfer system sump in which water may be present and in which petroleum products leaking from said system may accumulate.

3. The device of claim 2 wherein said container is a tube formed from polystyrene and positioned in said sump to contact said petroleum products regardless of the amount of water present in said sump.

4. The device of claim 3 wherein said tube is vertically aligned and extends from a bottom to a top of said sump.

5. The device of claim 2 wherein said container comprises a petroleum product soluble packet and includes air chamber means for maintaining said packet floating on top of any water in said sump.

6. In a system for storing, transferring or dispensing petroleum products having enclosed sumps for accumulation of water and petroleum products leaked into said enclosed sumps, the improvement comprising:

a device located in said enclosed sump having a water insoluble container having a quantity of a petroleum product mitigation agent enclosed therein; and a water insoluble, petroleum product soluble release means for releasing said quantity mitigation agent upon contact with a petroleum product whereby said release means is dissolved or melted by contact with said petroleum product thereby permitting said mitigation agent to be released from said container to neutralize said petroleum product.

7. The system of claim 6 wherein said container is a tube formed from polystyrene and positioned in said sump to contact said petroleum products regardless of the amount of water present in said sump.

8. The system of claim 6 wherein said tube is vertically aligned and extends from a bottom to a top of said sump.

9. The system of claim 6 wherein said container comprises a petroleum product soluble packet and includes air chamber means for maintaining said packet floating on top of any water in said sump.

10. A method for neutralizing petroleum products leaked into an enclosed sump of a fuel transfer system, comprising the steps of:

providing a water insoluble container having a quantity of a petroleum product mitigation agent enclosed therein in said sump in a position to contact the top of water collected in said sump; and releasing said quantity mitigation agent by providing a water insoluble, petroleum product soluble release means for said release upon contact with a petroleum product whereby said release means is dissolved or melted by contact with said petroleum product thereby permitting said mitigation agent to be released from said container to neutralize said petroleum product.

11. The method of claim 10 including the step of forming said container into a tube of polystyrene and positioning said tube in said sump to contact said petroleum products regardless of the amount of water present in said sump.

12. The method of claim 11 wherein said tube is vertically aligned and extends from a bottom to a top of said sump.

13. The method of claim 10 wherein said container comprises a petroleum product soluble packet and includes air chamber means for maintaining said packet floating on top of any water in said sump.

14. A device for preventing accumulation of petroleum products leaked in an enclosed portion of fuel transfer system, comprising:

a water insoluble container having a quantity of a petroleum product mitigation agent enclosed therein for mitigating the flammable nature of said petroleum product; and a water insoluble, petroleum product soluble release means for releasing said quantity mitigation agent upon contact with a petroleum product whereby said release means is dissolved or melted by said petroleum product thereby permitting said mitigation agent to be released from said container to mitigate the flammable nature of said petroleum product by encapsulating or dissolving said petroleum product.

15. A device for preventing accumulation of petroleum products in an enclosed portion of a fuel transfer system, comprising:

a valve actuatable between first and second positions, wherein said first position maintains said valve closed thereby preventing discharge of petroleum product mitigation agent from a container;

a water insoluble, petroleum product soluble rod positioned in said enclosed portion and normally maintaining said valve in said closed position and operably associated with said valve to change said valve from said closed position to a second open position upon at least a portion of said rod being dissolved by contact with petroleum products in said enclosed portion, thereby permitting said petroleum product mitigation agent to be released from said container to neutralize said petroleum product.

16. A device for neutralizing petroleum products in an enclosed portion of a fuel transfer system having a bottom wall comprising, a container for holding a petroleum product mitigation agent, said container having a closure stopper in a discharge opening at one end thereof, a water insoluble, petroleum product soluble rod extending between said bottom and normally supporting said closure stopper over said discharge opening in said container whereupon dissolving of a least a portion of said rod by contact with a petroleum product in said enclosure, said closure stopper is released to permit discharge of said mitigation agent into said enclosed portion to thereby dissolve said petroleum product.

17. A device for use in a fuel transfer system, comprising:

a sump in said system for collection of petroleum products leaking from said system, said sump having a bottom and side walls for collection of said products;

a valve in operable relationship with a container holding petroleum product mitigation agent in said sump and being actuatable between an open and a closed position; and a water insoluble, petroleum product soluble rod positioned vertically in said sump in contact with said bottom and extending up therefrom to normally maintain said valve in said closed position and operably associated with said valve to change said position upon at least a portion of said rod being dissolved by contact with petroleum products in said sumps, thereby permitting petroleum product mitigation agent to be released from said container to neutralize said petroleum products.

* * * * *